United States Patent
Scekic et al.

(10) Patent No.: US 11,028,888 B2
(45) Date of Patent: Jun. 8, 2021

(54) SELF-AMPLIFYING SAFETY BRAKE

(71) Applicant: Drillform Technical Services Ltd., Calgary (CA)

(72) Inventors: Vladimir Scekic, New Westminster (CA); Radu Gnasienco, Coquitlam (CA); Russell Turnbull, Burnaby (CA); Kevin Batalha, Vancouver (CA)

(73) Assignee: DRILLFORM TECHNICAL SERVICES LTD., Calgary (CA)

( * ) Notice: Subject to any disclaimer, the term of this patent is extended or adjusted under 35 U.S.C. 154(b) by 245 days.

(21) Appl. No.: 16/306,009

(22) PCT Filed: Jun. 3, 2016

(86) PCT No.: PCT/CA2016/050638
§ 371 (c)(1),
(2) Date: Nov. 30, 2018

(87) PCT Pub. No.: WO2017/205956
PCT Pub. Date: Dec. 7, 2017

(65) Prior Publication Data
US 2019/0211893 A1 Jul. 11, 2019

(51) Int. Cl.
*F16D 55/22* (2006.01)
*F16D 55/224* (2006.01)
(Continued)

(52) U.S. Cl.
CPC ........... *F16D 55/224* (2013.01); *F16D 59/02* (2013.01); *F16D 65/18* (2013.01); *F16D 2125/28* (2013.01); *F16D 2127/08* (2013.01)

(58) Field of Classification Search
CPC .. F16D 55/46; F16D 55/2245; F16D 55/2255; F16D 59/02; F16D 2121/06;
(Continued)

(56) References Cited

U.S. PATENT DOCUMENTS

| 3,592,300 A | * | 7/1971 | Thomas | F16D 55/224 |
| | | | | 188/72.2 |
| 3,869,024 A | * | 3/1975 | Hauth | F16D 55/46 |
| | | | | 188/72.5 |

(Continued)

FOREIGN PATENT DOCUMENTS

| CN | 109328274 | 2/2019 |
| FR | 2463326 | 2/1981 |

OTHER PUBLICATIONS

International Search Report for PCT/CA2016/050638.
(Continued)

*Primary Examiner* — Bradley T King
(74) *Attorney, Agent, or Firm* — Sheridan Ross P.C.

(57) ABSTRACT

A self-amplifying safety brake for a disc is provided. The brake includes: a housing; a spring assembly oriented perpendicular to an axis of rotation of the disc, the spring assembly including a first spring end and a second spring end; a sleeve assembly co-axially housing the spring assembly, wherein movement of the sleeve assembly in a first co-axial direction compresses the spring assembly at the first spring end and movement of the sleeve assembly in a second co-axial direction decompresses the spring assembly at the first spring end; a spring compressor configured to move the sleeve assembly in the first and second co-axial directions; a brake plate for frictionally engaging the disc; a lever-cam assembly associated with the sleeve assembly and the brake plate, the lever-cam assembly configured to translate movement of the sleeve assembly in the first coaxial direction into movement of the brake plate away from the disc.

13 Claims, 10 Drawing Sheets

(51) Int. Cl.
*F16D 59/02* (2006.01)
*F16D 65/18* (2006.01)
*F16D 125/28* (2012.01)
*F16D 127/08* (2012.01)

(58) Field of Classification Search
CPC ............. F16D 2121/12; F16D 2125/26; F16D 2125/28; F16D 2125/32; F16D 2127/08; F16D 2127/10
USPC ........................................................ 188/72.2
See application file for complete search history.

(56) References Cited

U.S. PATENT DOCUMENTS

| | | | | |
|---|---|---|---|---|
| 3,995,722 | A | | 12/1976 | Jones |
| 4,457,408 | A | | 7/1984 | Montalvo, III |
| 6,135,243 | A | * | 10/2000 | Kraihanzel ............ F16D 55/224 188/171 |
| 6,666,305 | B1 | | 12/2003 | Vohla |
| 7,967,114 | B2 | * | 6/2011 | Csak .................... F16D 65/18 188/72.7 |
| 8,991,561 | B2 | * | 3/2015 | Husmann ................ F16D 65/28 187/359 |
| 2007/0199781 | A1 | * | 8/2007 | Mackiewicz ............ F16D 65/18 188/370 |
| 2007/0251768 | A1 | * | 11/2007 | Sandro .................... B62L 1/10 188/24.12 |
| 2008/0230330 | A1 | | 9/2008 | Herr |
| 2008/0283347 | A1 | * | 11/2008 | Cao ........................ F16D 65/14 188/161 |
| 2010/0032249 | A1 | * | 2/2010 | Baumann ................. B60T 8/52 188/72.2 |
| 2011/0220440 | A1 | * | 9/2011 | Beier ..................... F16D 65/18 188/72.2 |
| 2017/0328431 | A1 | * | 11/2017 | Xu .......................... F16D 55/02 |
| 2020/0223403 | A1 | * | 7/2020 | Lee ......................... B60T 1/065 |

OTHER PUBLICATIONS

Written Opinion for PCT/CA2016/050638.
International Preliminary Report on Patentability for International (PCT) Application No. PCT/CA2016/050638, dated Dec. 4, 2018, 5 pages.
Official Action (with English translation) for Chinese Patent Application No. 201680087122.6, dated Jan. 19, 2020, 7 pages.
Notice of Grant (no English translation available) for Chinese Patent Application No. 201680087122.6, dated Aug. 17, 2020, 1 page.

* cited by examiner

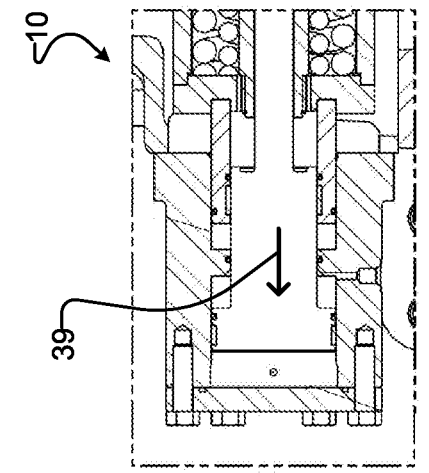
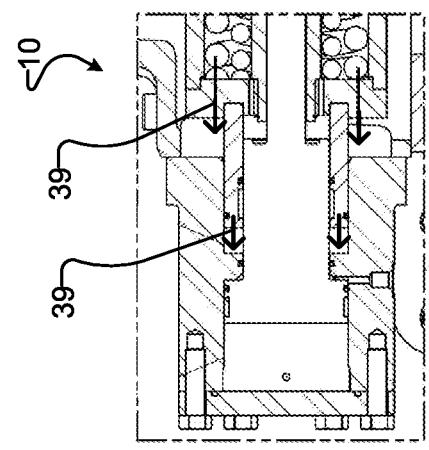
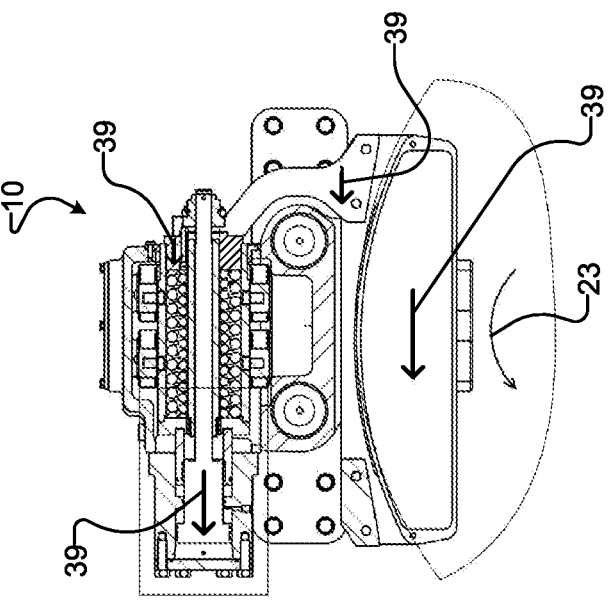
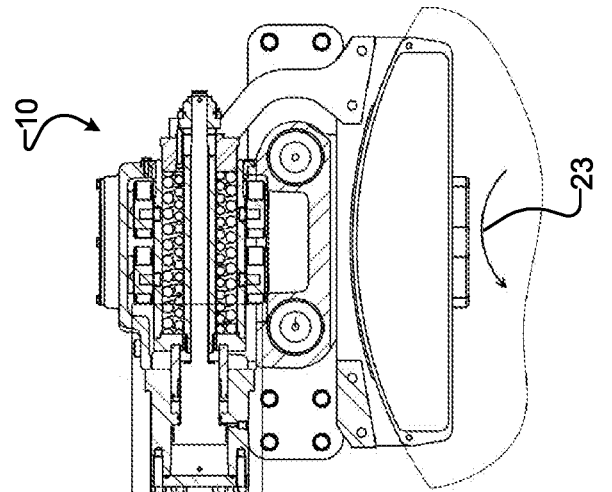
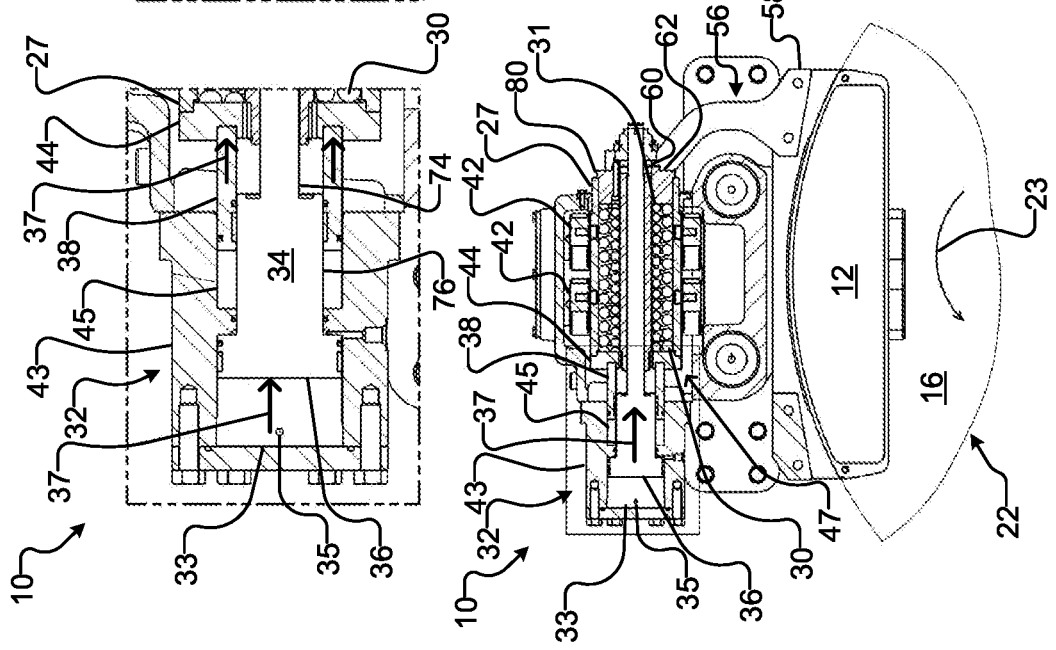

SELF-AMPLIFYING SAFETY BRAKE

CROSS-REFERENCE TO RELATED APPLICATIONS

This application claims priority to PCT Application No. PCT/CA2016/050638, having a filing date of Jun. 3, 2016, the entire contents of which are hereby incorporated by reference.

FIELD OF TECHNOLOGY

The following relates to a safety brake, more particularly, to a self-amplifying safety brake.

BACKGROUND

Safety brakes can be found for example in hoisting devices, wind turbines, conveyor belts, and the like. Safety brakes are used for emergency braking, for example when electricity is cut. Springs, magnets and the like may be used to apply the brakes, while pneumatics, hydraulics and the like may be used to release the brakes.

It is desirable to provide a safety brake that is simple to construct, space efficient, and less expensive to manufacture. It is further desirable to provide a safety brake that has fewer parts and has a correspondingly high or improved level of effectiveness compared to prior safety brake designs.

An aspect relates to a self-amplifying safety brake for a disc. The brake comprising: a housing; a spring assembly oriented perpendicular to an axis of rotation of the disc, the spring assembly comprising a first spring end and a second spring end; a sleeve assembly co-axially housing the spring assembly, wherein movement of the sleeve assembly in a first co-axial direction compresses the spring assembly at the first spring end and movement of the sleeve assembly in a second co-axial direction decompresses the spring assembly at the first spring end; a spring compressor configured to move the sleeve assembly in the first and second co-axial directions; a brake plate for frictionally engaging the disc; a lever-cam assembly associated with the sleeve assembly and the brake plate, the lever-cam assembly configured to translate movement of the sleeve assembly in the first coaxial direction into movement of the brake plate away from the disc, and to translate movement of the sleeve assembly in the second coaxial direction into movement of the brake plate toward the disc; and an amplification assembly comprising: a spring end adjacent the second spring end; a brake end adjacent the brake plate, whereby force against the brake plate from engagement with the disc is transmitted from the brake end to the spring end to compress the spring assembly at the second spring end and move the sleeve assembly in the second co-axial direction to amplify braking by further moving the brake plate toward the disc.

The lever-cam assembly may comprise: an arm rotatably coupled at a first end to the sleeve; a rotatable shaft coupled to a second end of the arm, the shaft extending perpendicularly to an axis of the spring assembly; a cam coupled to the rotatable shaft; and a cam follower comprising a first surface engaged with the cam and a second surface engaged with the brake plate.

The brake may comprise a plurality of cams coupled to the rotatable shaft and a corresponding plurality of cam followers. The brake may comprise a plurality of arms and a corresponding plurality of rotatable shafts. The arm and cam may be integrally formed.

The spring compressor may comprise a hydraulic cylinder. The hydraulic cylinder may comprise: a cap; a barrel; a piston in the barrel; a first chamber defined by the piston, the cap, and the barrel, the first chamber comprising a first port; a piston rod comprising a wide section connected to the piston and a narrow section connected to the wide section, wherein the narrow section receives the spring assembly; a second chamber defined by the barrel, the wide section of the piston rod and the sleeve assembly, the first chamber comprising a second port, whereby filling the first chamber and the second chamber with fluid through the first port and the second port, respectively, moves the piston and the piston rod in the first co-axial direction, whereby the resulting increase in pressure in the second chamber urges the sleeve assembly to move in the first co-axial direction; and whereby evacuating fluid from the first chamber and the second chamber through the first port and the second port, respectively, decreases the pressure in the second chamber to allow the sleeve assembly to move in the second co-axial direction due to decompression at the first end of the spring assembly.

The second port may be smaller than the first port to allow fluid to evacuate more rapidly from the second chamber compared to the first chamber. The second port may be sufficiently sized for unrestricted flow of fluid evacuating from the second chamber. The first port and the second port may be in fluid communication with a common fluid inlet/outlet.

The amplification assembly may comprise an amplification lever comprising the brake end and the spring end, wherein the cam follower and the brake plate are sliding engaged in a direction tangential to the disc, and wherein the brake end is rigidly associated with the brake plate, and wherein the spring end bears against the second spring end of the spring assembly.

The amplification assembly may comprise: an amplification plate disposed slidably in the first and second co-axial directions in the housing, the amplification plate rigidly associated in the first and second co-axial directions with the brake plate; and a flange extending perpendicularly from the amplification plate, the flange bearing against the second spring end of the spring assembly. The amplification plate may comprise channels through which force transfer projections rigidly connected to the brake plate extend, whereby the cam followers engage the brake plate through the force transfer projections.

In addition to the exemplary aspects and embodiments described above, further aspects and embodiments will become apparent by reference to the drawings and by study of the following detailed descriptions.

BRIEF DESCRIPTION

Some of the embodiments will be described in detail, with references to the following figures, wherein like designations denote like members, wherein:

FIG. 4A is a top cutaway partial view of the embodiment shown in FIG. 1 when the brake is released.

FIG. 4B is a top cutaway partial view of the embodiment shown in FIG. 1 when braking is initially activated at a first brake activation step.

FIG. 4C is a top cutaway partial view of the embodiment shown in FIG. 1 when braking is amplified at a second brake activation step.

FIG. 5A is a side cutaway view of the spring compressor of the embodiment shown in FIG. 1 when the brake is released.

FIG. 5B is a side cutaway view of the spring compressor of the embodiment shown in FIG. 1 when braking is initially activated at a first brake activation step.

FIG. 5C is a side cutaway view of a spring compressor of the embodiment shown in FIG. 1 when braking is amplified at a second brake activation step.

DETAILED DESCRIPTION

Figure 1:
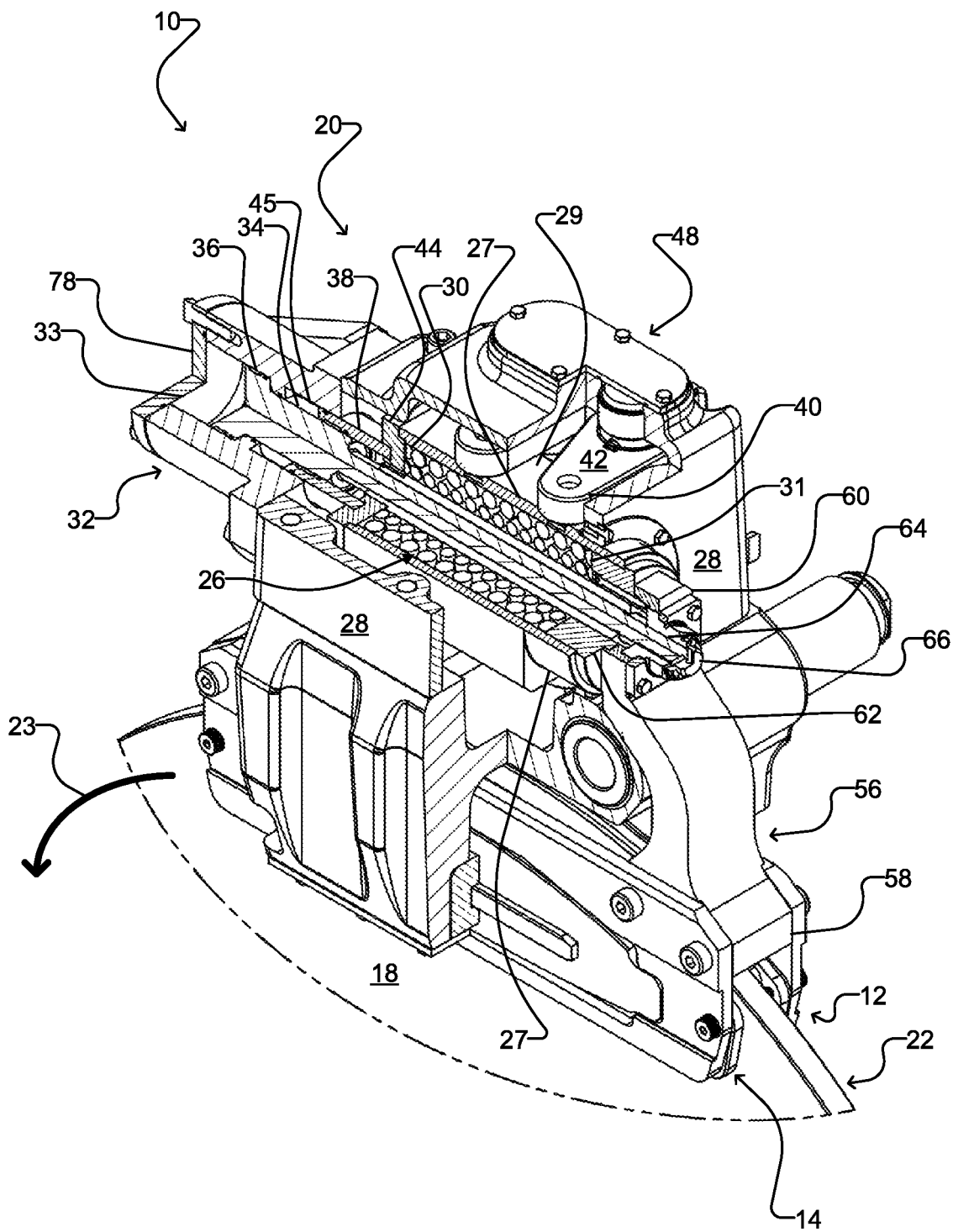
FIG. 1 is a left side cutaway view of a self-amplifying safety brake according to an embodiment, showing a detailed cutaway view of the spring compressor and the spring assembly.

Throughout the following description specific details are set forth in order to provide a more thorough understanding to persons skilled in the art. However, well known elements may not have been shown or described in detail to avoid unnecessarily obscuring the disclosure. Accordingly, the description and drawings are to be regarded in an illustrative, rather than a restrictive, sense.

This embodiment relates to a safety brake comprising a two-step brake activation mechanism. The two-step brake activation mechanism involves a spring compressor, a spring assembly, a sleeve assembly and a lever-cam assembly adapted to transmit force from movement of the sleeve assembly to a brake plate engageable with a face of a rotating disc. In the first step of brake activation the spring assembly is rapidly decompressed to quickly activate initial braking. Initial braking in turn activates the second step of brake activation, wherein the second end of the spring assembly is compressed to amplify and fully activate the braking.

FIGS. 1 to 7 show a brake 10 according to an embodiment. Brake 10 includes an actuator 20 connected to brake plates 12,14. When brake 10 is activated, brake plates 12,14 frictionally engage respective faces 16, 18 of disc 22 rotating in direction 23 to stop its rotation. Specifically, actuator 20 actuates brake plate 12 to actively exert frictional force on face 16 of rotating disc 20 to brake rotating disc 22, while brake plate 14 passively engages face 18 of rotating disc 22 as rotating disc 22 is pressed against it by brake plate 12.

Actuator 20 includes a housing 28 which houses a spring compressor 32, a spring assembly 26, a sleeve assembly, 47, a lever-cam assembly 48 and an amplifier assembly 56. In the embodiment shown, spring compressor 32 is a hydraulic cylinder; the term "fluid" as used herein may refer to a liquid or a gas. In other embodiments, spring compressor 32 may be a pneumatic cylinder or any other device that permits controlled compression and decompression of spring assembly 26 as described herein.

In the embodiment shown, spring assembly 26 comprises two coil springs. One of the two coil springs may comprise a greater diameter than the other coil spring such that the coil spring having a smaller diameter nest inside the coil spring having a greater diameter. In some embodiments a single coil spring, or more than two coil springs, may be used. In some embodiments, other types of springs may be used. In some embodiments, spring assembly 26 may comprise suitable devices other than actual springs, such as hydraulic springs, electric magnets, and the like.

Hydraulic cylinder 32 and spring assembly 26 are axially aligned and mounted in housing 28 in an orientation perpendicular to the axis of rotating disc 22. This orientation of spring assembly 26 (contrasted to the axis of the spring(s) being parallel to the axis of rotating disc of typical safety brakes) provides space-saving advantages. In some embodiments, such as that illustrated, hydraulic cylinder 32 and spring assembly 26 are in the same plane of rotating disc 22, providing further space-saving potential. In some embodiments, hydraulic cylinder 32 and spring assembly 26 may be generally parallel to, but offset from the plane of, rotating disc 22.

As best shown in FIGS. 1 and 4A, hydraulic cylinder 32 has a barrel 43 containing a piston 36 connected to a piston rod 34. A first chamber 33 of hydraulic cylinder 32 is defined by cap 78, barrel 43 and piston 36. First chamber 33 has a first port 35 through which hydraulic fluid enters and exits. Pressurizing first chamber 33 by filling it with fluid through first port 35 causes piston 36 to move in direction 37.

Piston rod 34 has a short wide section 76 that connects to a long, narrow section 74. At least a portion of narrow section 74 is received in spring assembly 26. Spring assembly 26 and at least a portion of wide section 76 are received in sleeve assembly 47. Sleeve assembly 47 includes spring sleeve 27, first spring end ring 44 and sleeve 38, which may be in fixed connection (as illustrated) or integrally formed. First end 30 of spring assembly 26 bears against first spring end ring 44. The length of spring assembly 26 is contained within spring sleeve 27. Wide section 76 is slidably received in sleeve 38 which in turn is slidably received in barrel 43. A second chamber 45 of hydraulic cylinder 32 is defined by barrel 43, wide section 76 and sleeve 38. Second chamber 45 includes a second port (not shown, but is analogous to port 155 shown in FIG. 11). Pressurizing the second chamber 33 filling it with fluid through the second port causes sleeve 38, and therefore the entire sleeve assembly 47, to move in direction 37. This movement of sleeve assembly 47 compresses spring assembly 26 at first spring end 30, in particular by first spring end ring 44 bearing against first spring end 30.

Figure 11:
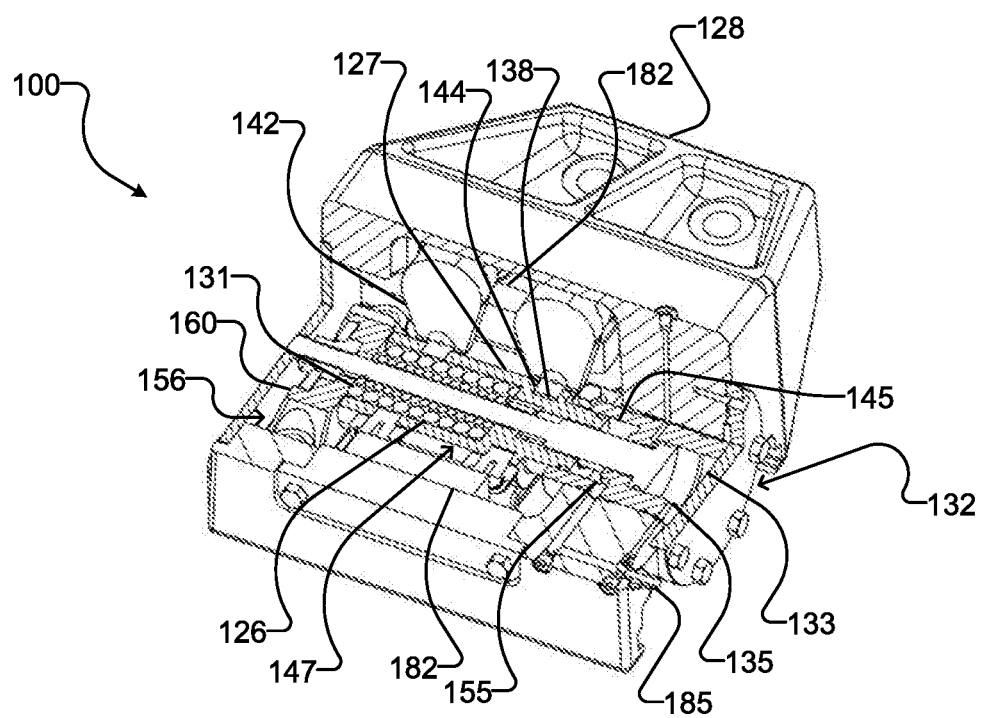
FIG. 11 is a cutaway partial view of the right brake actuator of the embodiment shown in FIG. 8, showing a detailed cutaway view of the spring compressor and the spring assembly.

First port 35 and the second port are in fluid communication with a common inlet (not shown, but is analogous with common fluid inlet/outlet 185 shown in FIG. 11). First port 35 has a smaller diameter than the second port, for reasons discussed below. The relative diameter of the first port 35 compared to the second port is predetermined to modulate braking action as discussed below.

Figure 2:
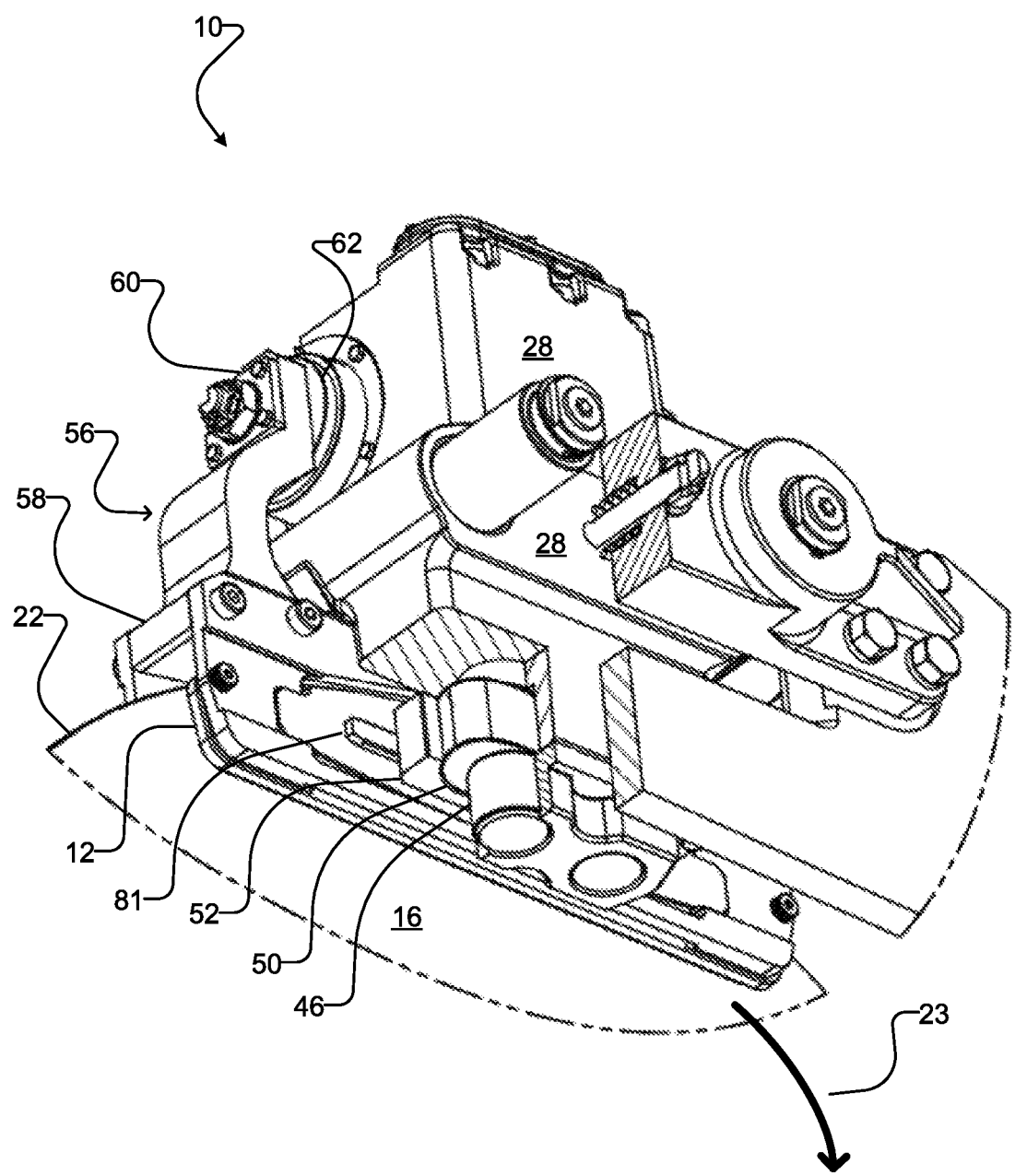
FIG. 2 is a right side cutaway partial view of the embodiment shown in FIG. 1.

Lever-cam assembly 48 includes a pair of lever arms 42. Each arm 42 has an inner end 40 that is rotatably coupled to exterior surface 29 of spring sleeve 27. Outer end 41 of each arm 42 is fixed to a corresponding shaft 46. As shown in FIGS. 2 and 6, a cam 50 is eccentrically fixed to each shaft 46. Cams 50 engage a cam follower 52 which in turn bear directly or indirectly against brake plate 12. Linear movement of inner ends 40 of arms 42 along with spring sleeve 27 causes rotation of shafts 46 through outer ends 41 of arms 42. Rotation of shafts 46 rotates cams 50 to generate a movement of cam follower 52 either toward or away from disc face 16 depending on the direction of rotation. Forward and backward movement of cam follower 52 thus transmits a force on brake plate 12 to bear against or move away from disc face 16 to respectively activate and release brake 10.

In some embodiments, assuming the co-efficient of friction between brake plate 12 and disc 22 is in the range of about 0.30 to 0.40, or about 0.36, the lever action provided by arms 42 of lever-cam assembly 48 must be at least 3. Accordingly, with reference to FIG. 6D, the ratio of a distance 90 from the center 92 (where inner end 40 of arm 42 rotatably couples to spring sleeve 27) to center 94 (of shaft 46) to a distance 96 from center 94 (of shaft 46) to center 98 of cam 50 must be at least 3, or 6 or greater.

Figure 3:
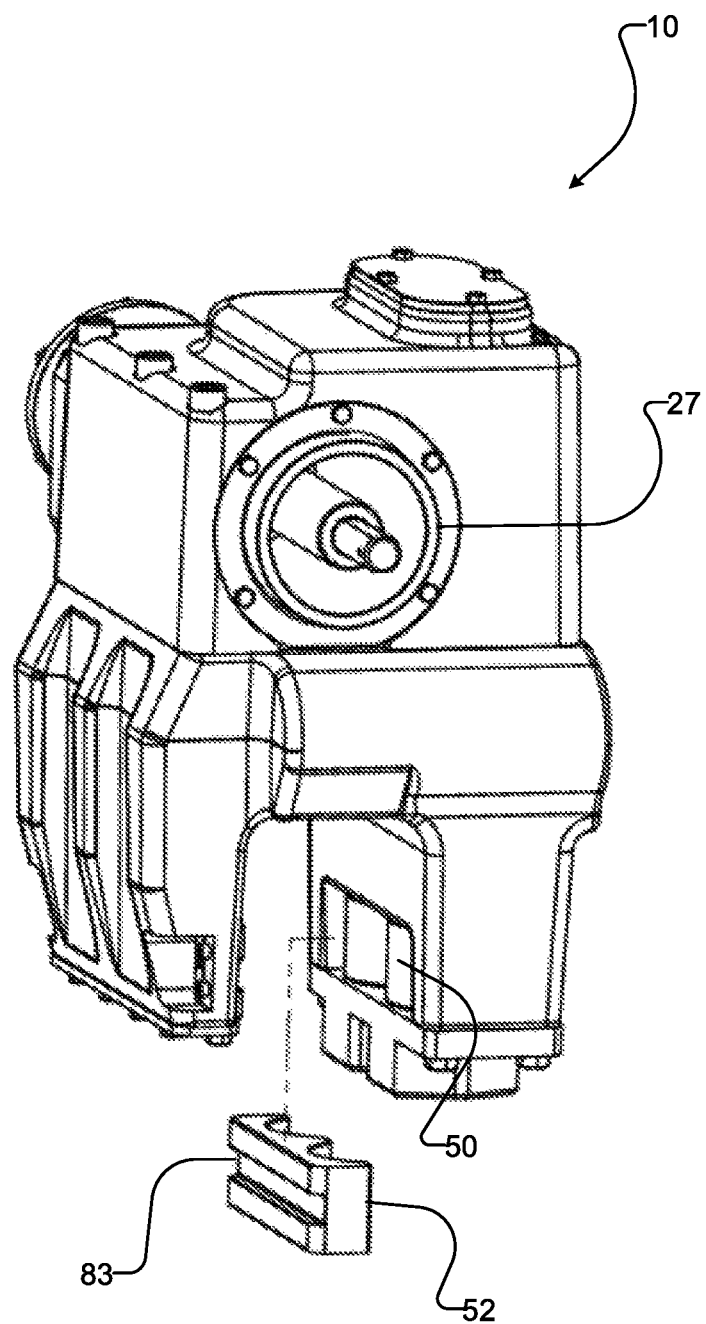
FIG. 3 is a rear partial view of the embodiment shown in FIG. 1.
Figure 7:
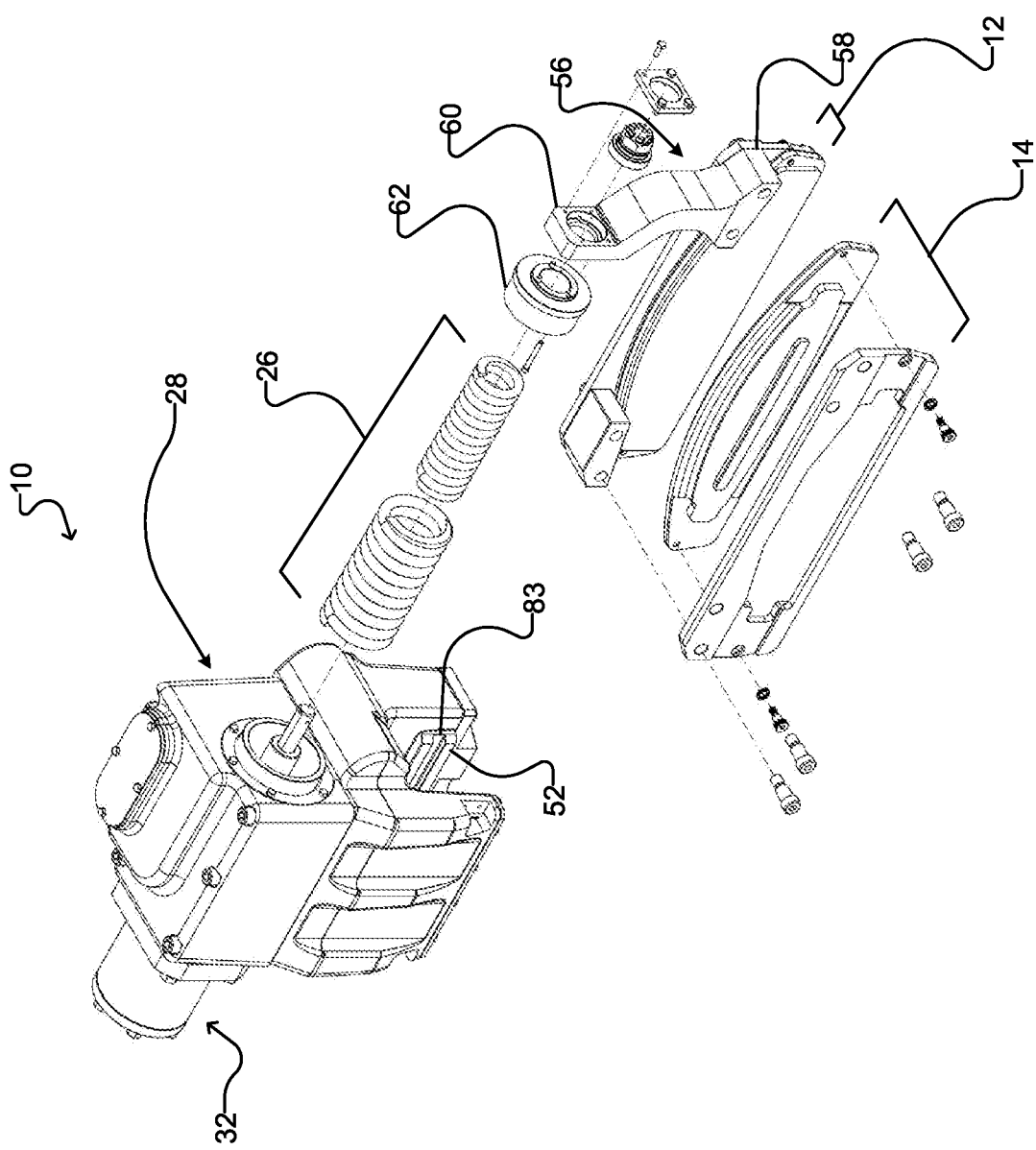
FIG. 7 is an exploded partial view of the embodiment shown in FIG. 1.
Figure 8:
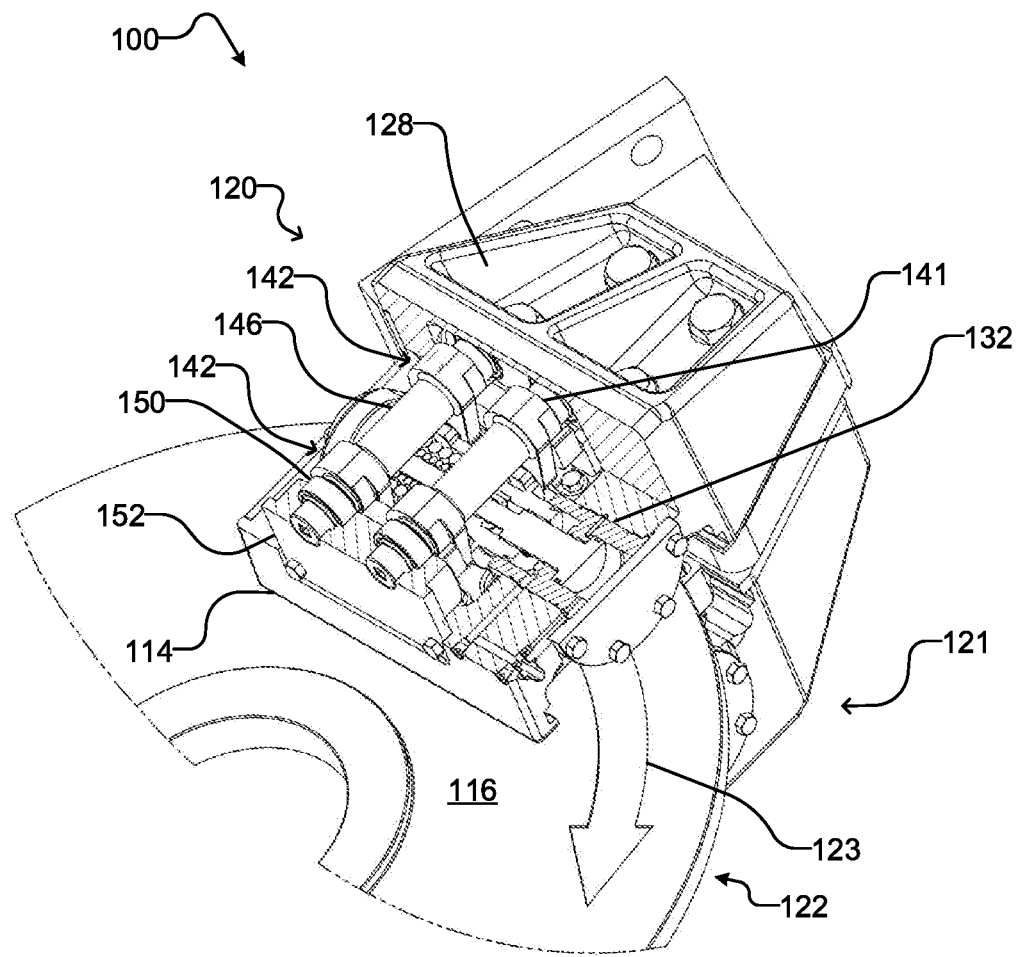
FIG. 8 is a right side cutaway partial view of a self-amplifying safety brake according to an embodiment.

As best shown in FIG. 7, amplifier assembly 56 of brake 10 is a "lever action" system that includes a lever element having a brake end 58 and a spring end 60. Brake end 58 is fixedly connected to brake plate 12. As shown in FIGS. 3 and 7, brake plate 12 is slidingly engaged with cam follower 52 through corresponding sliding members 81, 83, in this embodiment a tongue 81 on brake plate 12 and a groove 83 on cam follower 52. Spring end 60 is fixedly connected to one face of second spring end ring 62. The other face of second spring end ring 62 bears against second spring end 31. Second spring end ring 62 is also slidably received in spring sleeve 27.

Figure 6A:
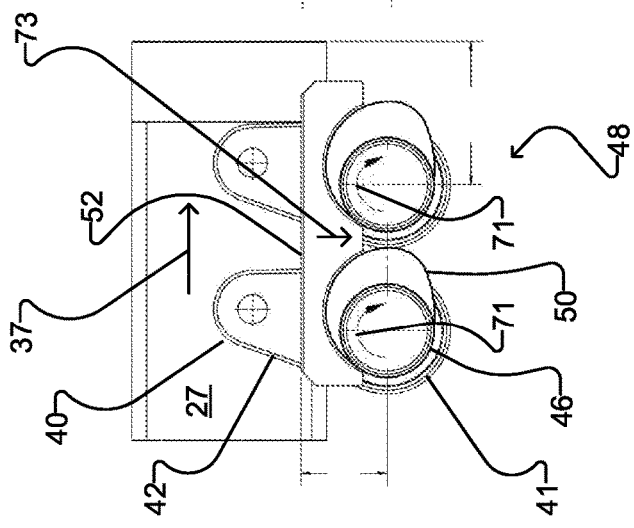
FIG. 6A is an isolated top view of the cam assembly of the embodiment shown in FIG. 1 when the brake is released.

The operation of releasing brake 10 is shown in FIGS. 4A, 5A and 6A. Hydraulic fluid is caused to enter hydraulic cylinder 32 at the common fluid inlet/outlet (not shown) and then into first chamber 33 through first port 35 and second chamber 45 through the second port (not shown). The flow of hydraulic fluid into first chamber 33 exerts pressure on piston 36 to move in direction 37. The flow of hydraulic fluid into second chamber 45 exerts pressure on sleeve 38 to move in direction 37. Movement of sleeve 38, and therefore sleeve assembly 47, in direction 37 means first spring end ring 44 (which is part of sleeve assembly 47) pushes against first spring end 30 to compress spring assembly 26 in direction 37, and also means spring sleeve 27 (which is also part of sleeve assembly 47) to move in direction 37. Referring to FIG. 6A, the movement of spring sleeve 27 in direction 37 causes rotation of arm 42 at the rotatable coupling between inner end 40 and spring sleeve 27, and through the fixed connection between outer end 40 and shaft 46, rotation of shaft 46 in direction 71. This torque is transmitted to cams 50 which rotate in direction 71 such that cam follower 52 (and therefore brake plate 12) moves in direction 73 away from face 16 of disc 22 to release brake 10.

Figure 6B:
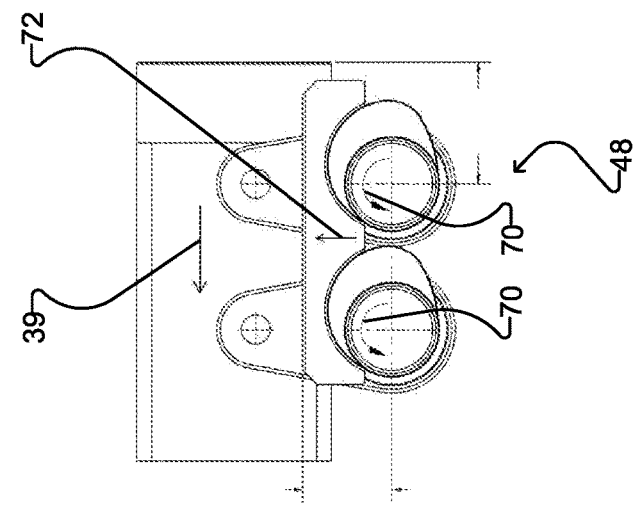
FIG. 6B is an isolated top view of the cam assembly of the embodiment shown in FIG. 1 when braking is initially activated at a first brake activation step.

The operation of the first brake activation step of brake 10, that is, initial rapid braking, is shown in FIGS. 4B, 5B and 6B. Hydraulic fluid is caused to exit first chamber 33 through first port 35 and exit second chamber 45 through the second port. Because the second port is larger in diameter than first port 35, fluid exits out of second chamber 45 more rapidly than out of first chamber 33. The rapid decrease of pressure in second chamber 45 allows sleeve 38 to quickly move in direction 39 as spring assembly 26 decompresses and through first spring end ring 44 rapidly urges the entire sleeve assembly 47 in direction 39. Referring to FIG. 6B, movement of spring sleeve 27 in direction 39 causes rotation shaft 46 in direction 70, and through cams 50, urging of cam follower 52 (and brake plate 12) in direction 72 toward face 16 of disc 2 to initiate braking.

Figure 6C:
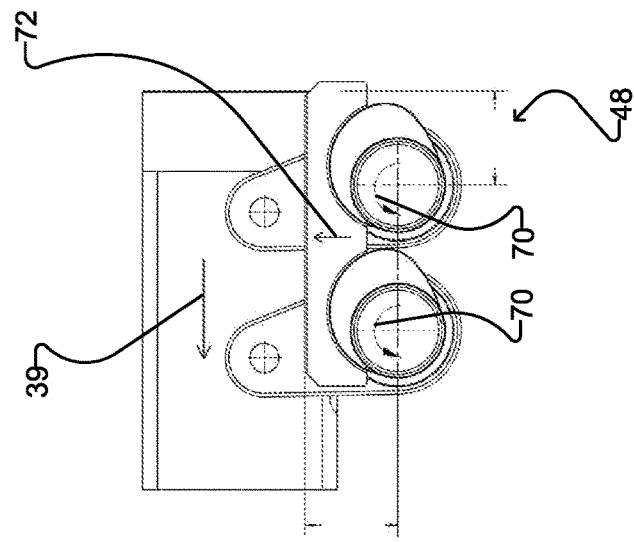
FIG. 6C is an isolated top view of the cam assembly of the embodiment shown in FIG. 1 when braking is amplified at a second brake activation step.
Figure 6D:
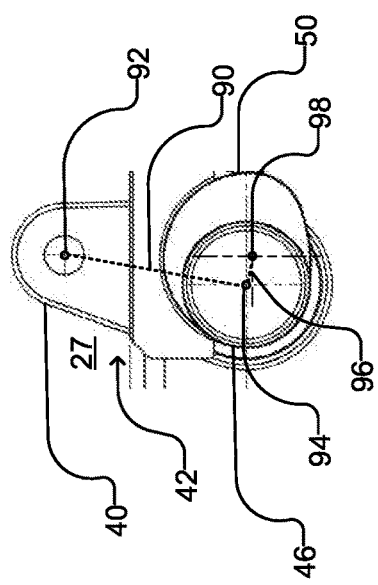
FIG. 6D is an isolated partial top view of the cam assembly of the embodiment shown in FIG. 1.

The operation of the second brake activation of brake 10, that is, amplification of braking, is shown in FIGS. 4C, 5C and 6C. As rapid initial braking is achieved as discussed above, the frictional contact between brake plate 12 and disc 22 results in a strong tendency for brake plate 12 to also move in direction 39 to match rotation 23 of disc 22 in direction 23. Brake plate 12 is able to move in direction 39 relative to actuator 20 because of the sliding relationship between brake plate 12 and cam follower 52. This movement transmits a force through amplification assembly 56 (which is rigidly associated with brake plate 12), in particular from brake end 58 connected to brake plate 12 to spring end 60 connected to one face of second spring end ring 62, all in direction 39. The other face of second spring end ring 62 then compresses spring assembly 26 by bearing against second spring end 31. Second spring end ring 62 also has a flange 80 that bears against spring sleeve 27 in direction 39. This further force urging spring sleeve 27 in direction 39, adding to the force transmitted from the first activation step. As a result, as shown in FIG. 6C, cams 50 further rotate in direction 70, resulting in amplified activation of braking since cam follower 52 and brake plate 12 are pressed further into face 16 of disc 22 in direction 72. Brake end 58 is also connected to a distal end 64 of piston rod 34 by a flanged cap 66, and therefore moves piston rod 34 (and piston 36) in direction 39, which is possible since the fluid pressure in first chamber 33 has decreased with the exiting of fluid therefrom beginning at the first brake activation step and continuing into the second brake activation step.

FIGS. 8 to 12 show a brake 100 according to another embodiment. Brake 100 has features corresponding to brake 10 with corresponding functions, and therefore discussion of these features do not need repeating. The following includes a description of some of the differences between brake 10 and 100.

Figure 9:
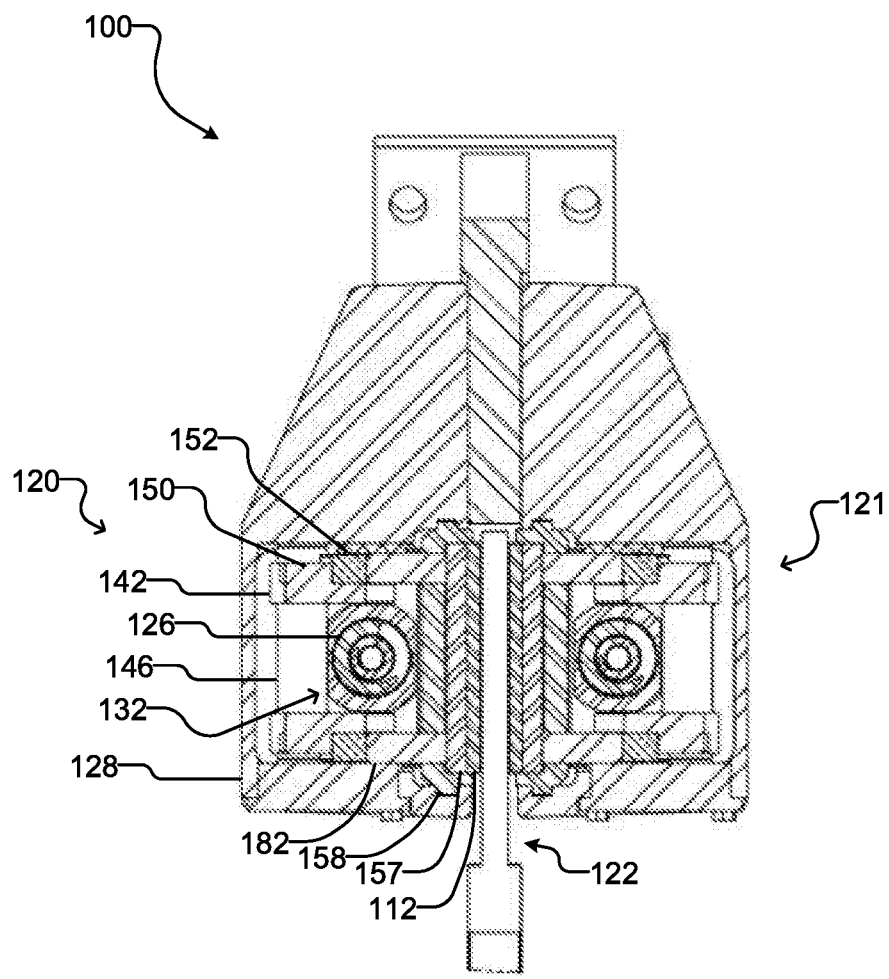
FIG. 9 is a front cutaway view of the embodiment shown in FIG. 8.

Brake 100 has two actuators 120,121. As shown in FIG. 9, actuators 120,121 are mirror images of each other. Each actuator 120,121 has a brake plate that engages a corresponding face of disc 122. For example, actuator 120 has a brake plate 112.

Figure 10:
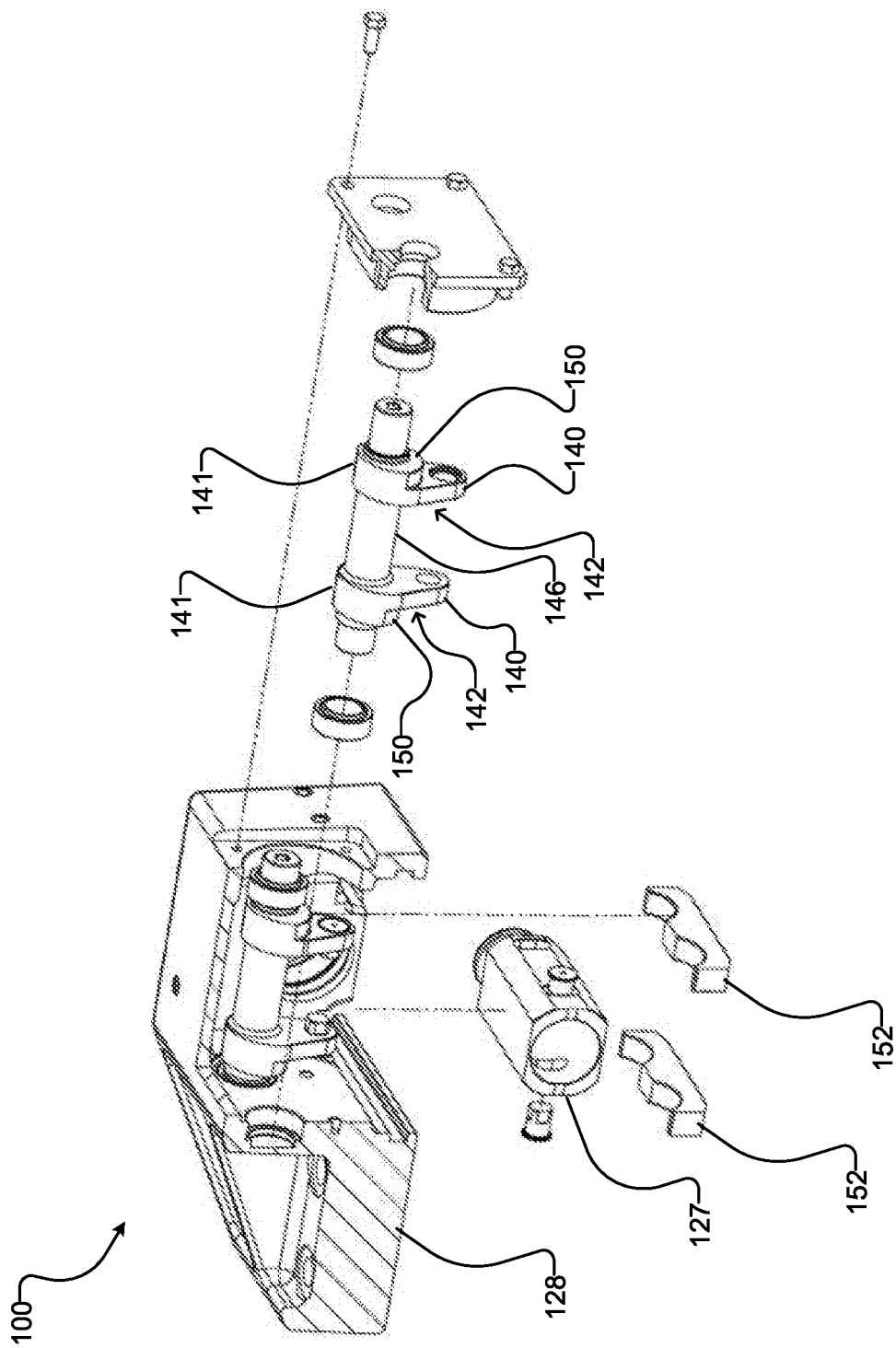
FIG. 10 is a rear exploded partial view of the right brake actuator of the embodiment shown in FIG. 8, showing detail of the cam assembly.

FIG. 10 shows each shaft 146 of lever-cam assembly 148 of brake 100 has two arms 142, with one arm on either side of spring sleeve 127. Accordingly, each lever-cam assembly 148 has two cam followers 152 that bear and provide a more distributed force against the brake plate. Cam followers 152 do not bear directly against brake plate 112, but rather bear against force transfer projections 182 shown in FIGS. 11 and 12. Force transfer projections 182 are rigidly connected to intermediate plate 157 which in turn is rigidly connected to brake plate 112. Also, unlike in brake 10, cams 150 are integrally formed with the outer ends 141 of arms 142.

FIG. 11 shows how fluid enters and exits hydraulic cylinder 132. Common fluid inlet/outlet 185 fluidly connects to a first narrow fluid line leading to first port 135 of first chamber 133 and a second wider fluid line leading to second port 155 of second chamber 145. In some embodiments the fluid lines may be of identical or similar size, with only the openings at first port 135 and second port 155 being sized differently.

Sleeve assembly 147 is an integral component including sleeve 138, first spring end ring 144 and spring sleeve 127.

Figure 12:
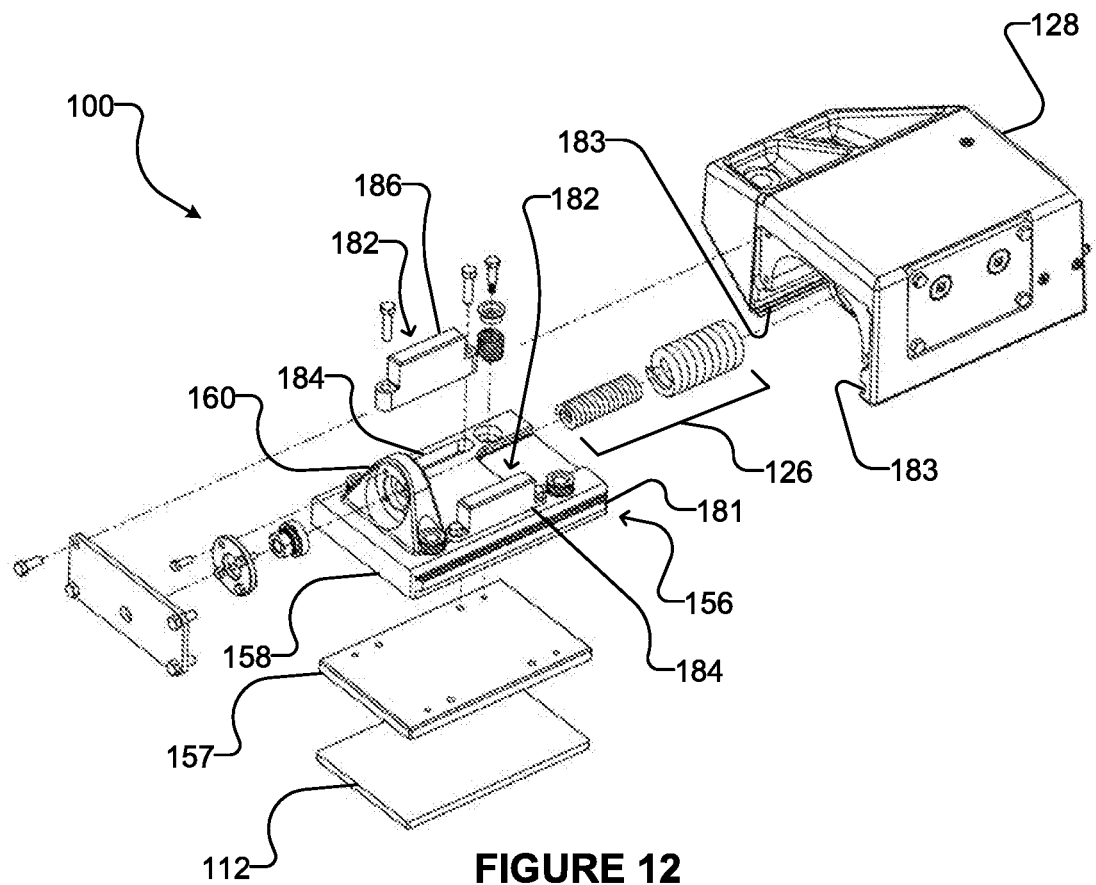
FIG. 12 is an exploded partial view of the right brake actuator of the embodiment shown in FIG. 8, showing detail of the amplifier assembly.

As shown in FIG. 12, amplifier assembly 156 uses a "direct action" mechanism to amplify initial braking. The brake end of amplifier assembly 156 is a plate 158. Plate 158 slidingly associated with housing 128 through sliding members 181,183, in this embodiment tongues 181 on either side of plate 158 and corresponding grooves 183 on housing 128. The spring end of amplifier assembly 156 is a flange 160 that projects perpendicularly from plate 158 and is configured to bear against second spring end 131 of spring assembly 126.

Plate 158 also includes channels 184 through which force transfer projections 182 extend from intermediate plate 157. Thus during the first brake activation step, plate 157 and brake plate 112 are urged by cam follower 152 acting on force transfer projections 182 toward disc 122. Plate 158 is not moveable in the direction toward and away from disc 122. During the second brake activation step, brake plate 112 and intermediate plate 157 are urged, by frictional engagement with disc 122, in the direction of the rotation of disc 122. This causes intermediate plate 157's force transfer projections 182, by virtue of their fitting engagement with channels 184 of plate 158, to urge plate 158 in the same direction, ultimately forcing flange 160 to bear against second spring end 131 of spring assembly 126 to amplify the braking. Despite the shift in position of force transfer projections 182, their bearing surfaces 184 for cam followers 152 are designed to be wide enough to fully engage cam followers 152. In some embodiments intermediate plate 157 may be absent and force transfer projections may be fixed directly to brake plate 112.

This application is intended to cover any variations, uses, or adaptations of embodiments of the invention using its general principles. For example:

Components of brake 10 and brake 100 are interchangeable where suitable. For example, brake 10 may modified to adopt the "direct action" amplifier assembly of brake 100, and brake 100 may be modified to adopt the "lever action" amplifier assembly of brake 10.

The sizes (e.g. diameters) of the openings of the first port and the second port may be adjusted to modulate the first and second braking actions. Modulating the size of the second port permits modulation of the speed of evacuation of fluid from the second chamber, in turn modulating the speed of initial braking (e.g. larger second port size means faster initial braking). Modulating the size of the first port modulates the speed of evacuation of fluid from the first chamber, modulating the speed of movement of the piston in direction 39 and thereby modulating the speed at which the spring end of the amplifier assembly compresses the second end of the spring assembly and moves the sleeve assembly in direction 39 (e.g. smaller first port size means more gradual amplified braking).

Although the present invention has been disclosed in the form of preferred embodiments and variations thereon, it will be understood that numerous additional modifications and variations could be made thereto without departing from the scope of the invention.

For the sake of clarity, it is to be understood that the use of 'a' or 'an' throughout this application does not exclude a plurality, and 'comprising' does not exclude other steps or elements.

The invention claimed is:

1. A self-amplifying safety brake for a disc, the brake comprising:
   a housing;
   a spring assembly oriented perpendicular to an axis of rotation of the disc, the spring assembly comprising a first spring end and a second spring end;
   a sleeve assembly co-axially housing the spring assembly, wherein movement of the sleeve assembly in a first co-axial direction compresses the spring assembly at the first spring end and movement of the sleeve assembly in a second co-axial direction decompresses the spring assembly at the first spring end;
   a spring compressor configured to move the sleeve assembly in the first and second co-axial directions;
   a brake plate for frictionally engaging the disc;
   a lever-cam assembly associated with the sleeve assembly and the brake plate, the lever-cam assembly configured to translate movement of the sleeve assembly in the first co-axial direction into movement of the brake plate away from the disc, and to translate movement of the sleeve assembly in the second co-axial direction into movement of the brake plate toward the disc; and
   an amplification assembly having:
      a spring end adjacent the second spring end;
      a brake end adjacent the brake plate,
      whereby force against the brake plate from engagement with the disc is transmitted from the brake end to the spring end to compress the spring assembly at the second spring end and move the sleeve assembly in the second co-axial direction to amplify braking by further moving the brake plate toward the disc.

2. The brake according to claim 1, wherein the lever-cam assembly comprises:
   an arm rotatably coupled at a first end to the sleeve assembly;
   a rotatable shaft coupled to a second end of the arm, the shaft extending perpendicularly to an axis of the spring assembly;
   a cam coupled to the rotatable shaft;
   a cam follower comprising a first surface engaged with the cam and a second surface engaged with the brake plate.

3. The brake according to claim 2, wherein the cam is one of a plurality of cams that are coupled to the rotatable shaft, and wherein the cam follower is one of a plurality of cam followers corresponding to the plurality of cams.

4. The brake according to claim 2, wherein the arm is one of a plurality of arms rotatably coupled to the sleeve assembly, and wherein the rotatable shaft is one of a plurality of rotatable shafts corresponding to the plurality of arms.

5. The brake according to claim 2, wherein the arm and the cam are integrally formed.

6. The brake according to claim 1, wherein the spring compressor comprises a hydraulic cylinder.

7. A brake according to claim 6, wherein the hydraulic cylinder comprises:
   a cap;
   a barrel;
   a piston in the barrel;
   a first chamber defined by the piston, the cap, and the barrel, the first chamber comprising a first port;
   a piston rod comprising a wide section connected to the piston and a narrow section connected to the wide section, wherein the narrow section receives the spring assembly;

a second chamber defined by the barrel, the wide section of the piston rod and the sleeve assembly, the second chamber comprising a second port, whereby filling the first chamber and the second chamber with fluid through the first port and the second port, respectively, moves the piston and the piston rod in the first co-axial direction, whereby the resulting increase in pressure in the second chamber urges the sleeve assembly to move in the first co-axial direction;

and whereby evacuating fluid from the first chamber and the second chamber through the first port and the second port, respectively, decreases the pressure in the second chamber to allow the sleeve assembly to move in the second co-axial direction due to decompression at the first spring end of the spring assembly.

8. The brake according to claim 7, wherein the second port is larger than the first port to allow fluid to evacuate more rapidly from the second chamber compared to the first chamber.

9. The brake according to claim 8, wherein the second port is sufficiently sized for unrestricted flow of fluid evacuating from the second chamber.

10. The brake according to claim 8, wherein the first port and the second port are in fluid communication with a common fluid inlet/outlet.

11. The brake according to claim 2, wherein the amplification assembly comprises an amplification lever comprising the brake end and the spring end, wherein the cam follower and the brake plate are slidingly engaged in a direction tangential to the disc, and wherein the brake end is rigidly associated with the brake plate, and wherein the spring end bears against the second spring end of the spring assembly.

12. The brake according to claim 1, wherein the amplification assembly comprises:
　　an amplification plate disposed slidably in the first and second co-axial directions in the housing, the amplification plate rigidly associated in the first and second co-axial directions with the brake plate; and
　　a flange extending perpendicularly from the amplification plate, the flange bearing against the second spring end of the spring assembly.

13. The brake according to claim 12, wherein the amplification plate comprises channels through which force transfer projections rigidly connected to the brake plate extend, whereby a cam follower engages the brake plate through the force transfer projections.

* * * * *